United States Patent [19]
Cutler

[11] 3,952,238
[45] Apr. 20, 1976

[54] PROGRAMMABLE POSITIONING APPARATUS AND ACCELERATION CONTROL SYSTEM PARTICULARLY USEFUL THEREIN

[76] Inventor: Hymie Cutler, 16230 Santa Rosa, Detroit, Mich. 48221

[22] Filed: Nov. 29, 1973

[21] Appl. No.: 420,207

[52] U.S. Cl. ............................. 318/571; 318/561
[51] Int. Cl.² .......................................... G05B 19/28
[58] Field of Search ............... 318/561, 571; 187/29

[56] References Cited
UNITED STATES PATENTS

| | | |
|---|---|---|
| 3,448,362 | 6/1969 | Durf et al. ...................... 318/561 X |
| 3,482,155 | 12/1969 | Fredriksen ........................ 318/561 |
| 3,612,220 | 10/1970 | Hall .................................... 187/29 |
| 3,629,560 | 12/1971 | Slawson ....................... 318/571 X |
| 3,699,555 | 10/1972 | Du Vall....................... 318/561 UX |
| 3,699,555 | 10/1972 | Du Vall....................... 318/561 UX |
| 3,731,177 | 5/1973 | Command et al. ............. 318/561 X |
| 3,792,333 | 2/1974 | Cutler.................................. 318/571 |
| 3,809,986 | 5/1974 | Visser.................................. 318/561 |

*Primary Examiner*—James R. Scott
*Assistant Examiner*—John W. Redman
*Attorney, Agent, or Firm*—Benjamin J. Barish

[57] ABSTRACT

Programming positioning apparatus is described for performing a programmed motion in a quick and smooth manner avoiding shock loads that shorten equipment life.

The described apparatus is a hard-wired digital system which is preprogrammed with respect to maximum acceleration and maximum velocity; receives the programmed distance data, makes the required calculations relating to the time periods the system operates according to a maximum acceleration mode, a maximum velocity mode and a maximum deceleration mode in order to perform the programmed motion at maximum speed while keeping the acceleration forces within acceptable limits; and produces motion command pulses supplied to the drive. The maximum acceleration can be held to a constant value fixed beforehand, or can be varied so that the acceleration will automatically adapt itself to produced inertia-forces or to the capability of the motor to drive its load.

31 Claims, 11 Drawing Figures

PROGRAMMABLE POSITIONING APPARATUS AND ACCELERATION CONTROL SYSTEM PARTICULARLY USEFUL THEREIN

BACKGROUND OF THE INVENTION

The invention relates to a programmable positioning apparatus, and also to acceleration control systems particularly useful therein. The invention is especially suited for use in numerical control machines for precisely positioning an article, such as a machine tool or a workpiece, a programmed distance and is therefore described with respect to that application.

The productivity of a numerical control machine tool is greatly influenced by the speed at which it performs a programmed motion. On the other hand, too rapid acceleration and deceleration or too high a velocity of operation can produce shock loads, undue friction, or other effects that shorten the life of the equipment.

An object of the present invention is to provide a programmable positioning system performing a programmed motion very quickly and smoothly so as to increase the productivity of the apparatus while at the same time eliminating shock loads and excessive velocities which are liable to shorten the life of the apparatus.

Another object of the invention is to provide a novel digital acceleration control system to control the acceleration and deceleration of a driven article according to a rate which may be fixed beforehand, or which may be permitted to vary with inertia-forces, drive capability, or the like.

SUMMARY OF THE PRESENT INVENTION

According to the invention, the apparatus controls the drive to first accelerate the article at a predetermined maximum rate of acceleration until either (a) the article attains a predetermined maximum velocity, or (b) the article traverses one-half the programmed distance before attaining the predetermined maximum velocity. When (a) occurs, the apparatus continuously computes the distance-to-go for the article to have moved its programmed distance, controls the drive to move the article at the predetermined maximum velocity until its distance-to-go is equal to the distance traversed to obtain the predetermined maximum velocity, and then decelerates the drive at the same rate as the predetermined maximum acceleration rate. When (b) occurs, the drive is controlled so that immediately after the article has traversed one-half the programmed distance, the article is decelerated at the same rate as the predetermined maximum acceleration rate.

More particularly, the apparatus of the present invention comprises data input means for inputting the programmed distance data (hereinafter referred to as "D"), acceleration data (hereinafter referred to as "C"), relating to the predetermined rate of acceleration, and velocity data (hereinafter referred to as "V") relating to the predetermined maximum velocity. The apparatus computes or establishes the distance (hereinafter referred to as "B") corresponding to the distance to be traversed by the article when accelerated at the predetermined rate of acceleration from zero velocity to the predetermined maximum velocity. Generally, the acceleration data (C) and velocity data (V) would be established and stored for each axis and remain unchanged, and only the distance data (D) would be programmed for each desired motion.

The apparatus further includes acceleration control means for generating an acceleration electrical signal corresponding to the predetermined rate of acceleration, and velocity control means for generating a velocity electrical signal corresponding to the predetermined maximum velocity. The apparatus continuously computes a distance (hereinafter referred to as "$d$") corresponding to the remaining distance-to-go for the article to reach the programmed distance. Normally, the drive is controlled by the predetermined acceleration electrical signal so as to drive the article at the maximum acceleration rate, but the maximum velocity electrical signal is used to drive the article whenever the programmed distance D is more than twice the distance B, and the computed distance-to-go is more than the distance B but less than (D-B).

The systems described below are hard-wired digital systems, wherein the acceleration control means comprises an acceleration generator generating a first series of electrical pulses at a repetition rate corresponding to the predetermined rate of acceleration, and the velocity control means comprises a velocity generator generating a second series of electrical pulses at a repetition rate corresponding to the predetermined maximum velocity. The system, at the appropriate time and according to the conditions mentioned above, enables one or the other series of pulses to be used as the motion command pulses supplied to the drive.

The system further includes acceleration sign determining means monitoring the distance-to-go (d) and switching, in response thereto, the acceleration generator from acceleration operation to deceleration operation.

According to another aspect of the invention, the acceleration generator comprises a pulse generator producing pulses at a predetermined pulse repetition rate, a summing register, and means adding into the latter register during acceleration, and subtracting from it during deceleration, the pulses produced by the pulse generator. The acceleration generator further includes an error register, means clearing the error register at the start of the positioning operation, means adding into the error register the acceleration data (C) relating to the predetermined rate of acceleration, and means subtracting from the error register the quantity in the summing register whenever a pulse is generated by the pulse generator. A sign detector detects the sign of the error register, and so long as the error register is negative, a motion command pulse is produced. With each generation of a motion command pulse, the acceleration data (C) is added into the error register until the error register becomes zero or positive, at which time the generation of further motion command pulses ceases until the next subtraction of the amount in the summing register makes the error register negative.

The acceleration data (C) may be a constant value for each axis stored in the apparatus. It may be held fixed, or it may be influenced by a varying value, varying for example with the inertia-forces produced by the acceleration of the article or with the following-error occurring during the acceleration of the article.

Further features and advantages of the invention will be apparent from the description below.

BRIEF DESCRIPTION OF THE DRAWINGS

The invention is herein described, by way of example only, with reference to several preferred embodiments thereof illustrated in the accompanying drawings, wherein.

DESCRIPTION OF THE PREFERRED EMBODIMENTS

General Layout of FIGS. 1–7 System

Figure 1:
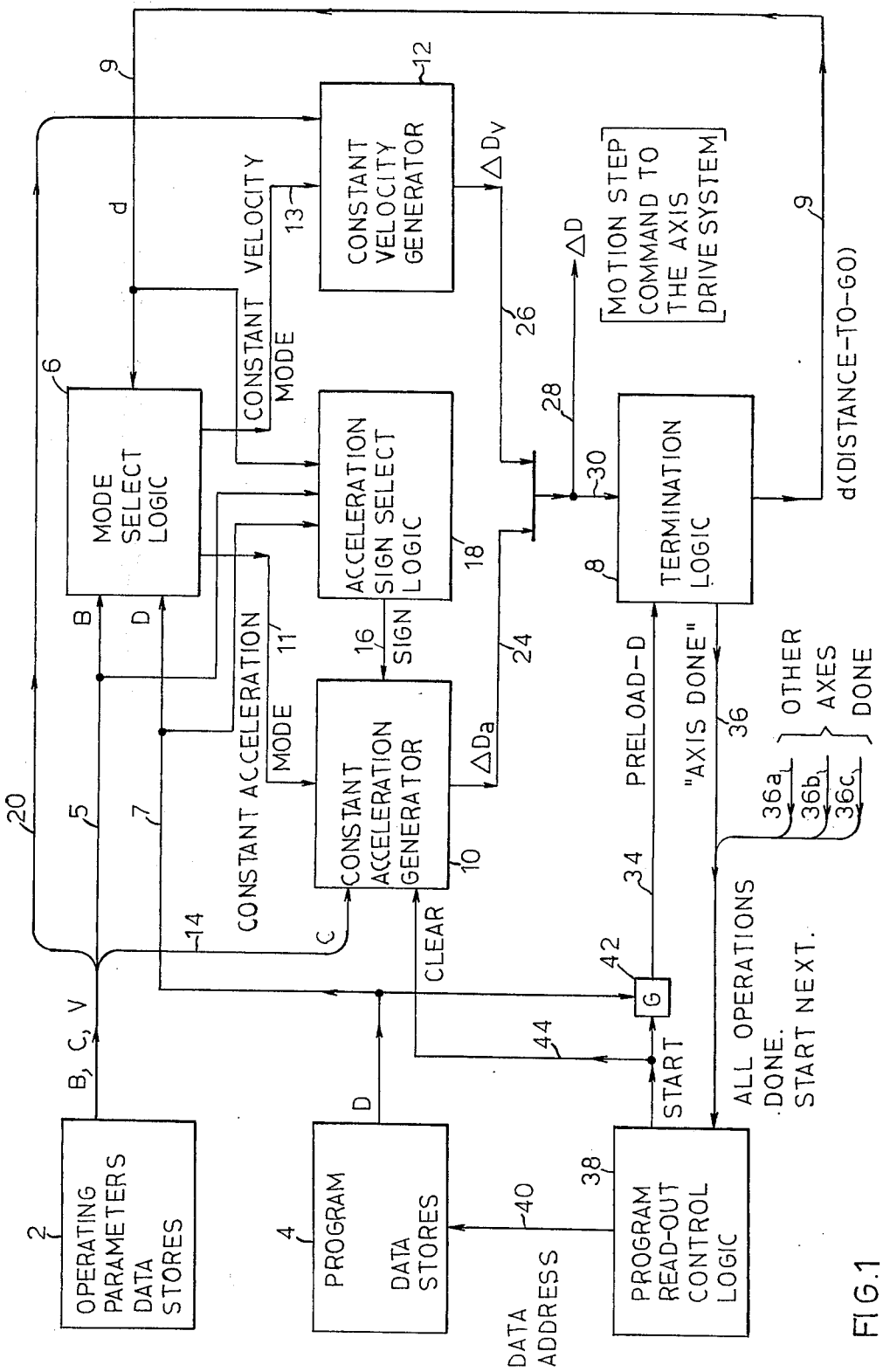
FIG. 1 is a block diagram illustrating one form of positioning system constructed in accordance with the invention to provide a maximum acceleration, velocity and deceleration operation.
Figure 2A:
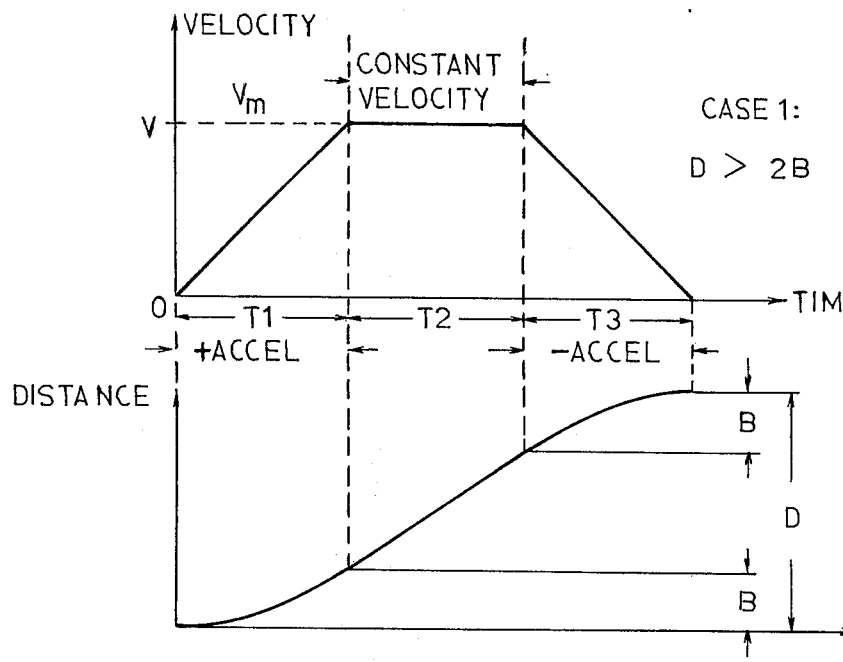
FIGS. 2a and 2b are diagrams helpful in understanding the present invention.
Figure 2B:
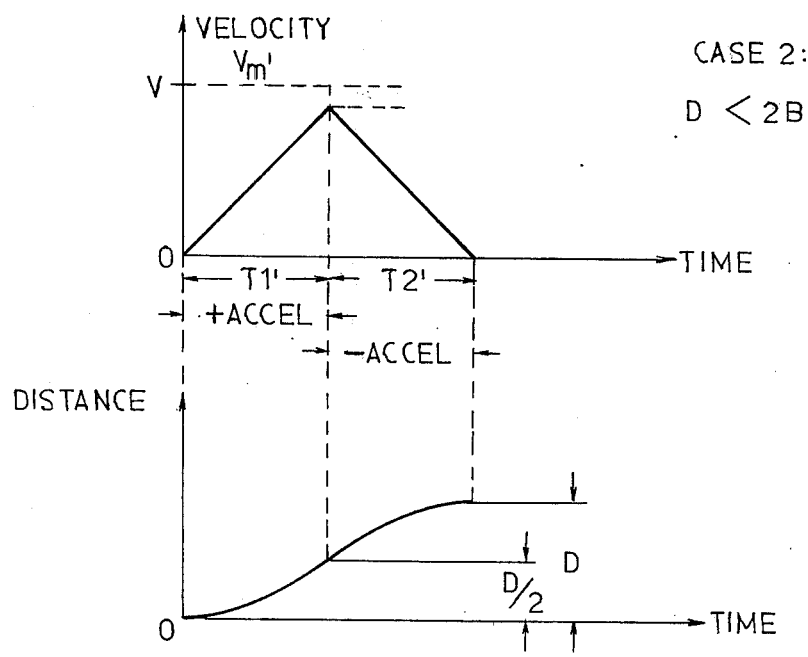

FIG. 1 illustrates one form of positioning system constructed in accordance with the invention, but before proceeding with its description, it will be helpful to first refer to FIGS. 2a and 2b and the following preliminary explanation.

It is well known that the mechanical forces acting on a moving body are directly related to its acceleration. Thus, shock loads will be avoided if the acceleration is held at a prescribed value which has been selected to keep these forces within acceptable limits. In addition, every drive system has a limit as to the velocity at which it can operate, to avoid undue friction, etc., and if the velocity is held at the maximum value, such effects can also be kept within acceptable limits.

The positioning system of the present invention recognises the foregoing considerations, continuously makes the necessary computations, and automatically controls the acceleration and velocity of the drive at their maximum acceptable limits.

In positioning the article according to different programmed distances, either one of two situations may be encountered as illustrated in FIGS. 2a and 2b.

FIG. 2a illustrates the situation wherein the programmed distance "D" is greater than twice the distance "B", the latter corresponding to the distance to be traversed by the article when accelerated at the maximum prescribed acceleration from zero velocity to the maximum prescribed velocity. In such a case, the article is driven during a first time interval (T1) at a velocity which increases at the maximum acceleration rate until it reaches the maximum prescribed velocity (Vm), at which time it is driven during a second time interval (T2) at a constant velocity (the prescribed maximum velocity Vm) until the third time interval (T3) wherein the velocity is decreased at the prescribed acceleration rate until it reaches zero velocity. Time interval T1 is the time it takes for the article to traverse distance B, when it reaches the prescribed maximum velocity, Vm; since the article is decelerated during time interval T3 at the same rate as it was accelerated during time interval T1, time interval T3 (which ends with zero velocity) will be exactly the same as time interval T1 (which started from zero velocity).

It will be appreciated that whenever the programmed distance D is more than twice the distance B, the control as illustrated in FIG. 2a will result in positioning the article in the shortest period of time permitted by the acceleration and velocity limitations of the system.

FIG. 2b illustrates the situation wherein the programmed distance "D" is less than twice the distance "B". In such a case, the maximum velocity (Vm') will not be attained. Here, the article is driven at the prescribed maximum acceleration for a period of time T1' until it traverses one-half the programmed distance D at which time it is decelerated at the prescribed maximum rate (during time interval T2') until it attains zero velocity. Such a control in this type of situation will result in the positioning of the article in the shortest possible time consistent with the prescribed maximum acceleration limitation.

FIG. 1 illustrates one form of positioning system constructed to operate as described above. The input data to this positioning system for each axis are quantities labeled V, C, and D, wherein, as indicated above: "D" is the programmed distance of axis motion, "V" is the prescribed maximum velocity for that axis, and "C" is a quantity that establishes the prescribed maximum acceleration and deceleration of the axis.

The quantities C and V determine the value of B, namely the distance required to reach the maximum prescribed velocity B for the prescribed maximum acceleration C. Generally, the arrangement would be that quantities V and C would be established and stored for each axis and remain unchanged; only the distance D would be programmed for each desired motion. The control would then automatically provide the acceleration maximum velocity and deceleration as had been prescribed.

Turning now to FIG. 1, the system therein illustrated comprises a data store 2 in which the operating parameters B, C and V are stored. This data establish the values of maximum acceleration, deceleration, and velocity. The quantity B is preferably established from C within the apparatus itself, so that only C and V are stored. This data may be stored as digital numbers in switches, read-only-memories, magnetic memories, or other media. The quantity V may alternatively be a potentiometer setting. The positioning system is arranged so that a variation in the value V will not affect the completion of the programmed motion with a deceleration to zero velocity.

Further included is a data store 4 for the programmed distance D. This store may be in the form of switches, integrated circuits, punched tape, magnetic tape or other media convenient for digital storage. Data store 4 will also contain the identification as to which axes are to operate, in what direction, and also auxilliary "on-off" commands for valves and motor starters.

A Mode Select Logic 6 receives the B and D data inputted from stores 2 and 4 via lines 5 and 7, respectively. It also receives data "d" relating to the distance-to-go as computed in Termination Logic Unit 8, the "d" data being fed thereto via line 9. Mode Select Logic Unit 6 determines if the axis positioning should be in the constant acceleration mode or in the constant velocity mode, and produces an enabling signal fed to the Constant Acceleration Generator 10 via line 11, or fed to the Constant Velocity Generator 12 via line 13.

The Constant Acceleration Generator 10, when enabled by the signal on line 11, receives the prescribed acceleration data via line 14 from store 2, and produces a series of pulses ΔDa at a repetition rate in accordance with the prescribed constant acceleration. In addition it receives, via line 16 from Acceleration Sign Select Logic 18, a sign signal which determines the sign of the acceleration, a positive signal determining acceleration and a negative signal determining deceleration.

The Constant Velocity Generator 12 receives the velocity data V via line 20 from data store 2 and, when enabled by an enabling signal on line 13 from Mode Select Logic 6, produces a series of pulses ΔDv at a repetition rate corresponding to the prescribed maximum velocity.

Pulses ΔDa are outputted from Constant Acceleration Generator 10 via line 24, and pulses ΔDv are outputted from Constant Velocity Generator 12 via line 26, both of the lines being connected to output line 28 where the enabled pulses appear as the axis motion command pulses ΔD applied to the respective axis drive.

Axis pulses ΔD are also supplied via line 30 to Termination Logic 8 which computes the distance-to-go "d" applied via line 9 to Mode Select Logic 6. Distance "d" is also applied to Acceleration Sign Select Logic 18 via line 32 and is used in determining the sign of Logic 18, that is whether Constant Acceleration Generator 10 operates in the acceleration mode or in the deceleration mode.

Termination Logic 8 is preloaded with the programmed distance D via line 34 and continuously computes the distance-to-go "d" which, as indicated above, is applied to the Mode Select Logic 6 via line 9 and to the Acceleration Sign Select Logic 18 via line 32. When the axis is at its programmed position (i.e., $d =$ zero), Termination Logic 8 produces an "axis-done" signal on line 36 which is supplied to Read-Out Control Logic 38.

Similar systems are provided for each drive axis, and when the "axis-done" signals of all the axis are supplied (via lines 36a, 36b, 36c) to the Read-Out Control Logic 38, the latter selects the next programmed data from store 4 via line 40, and also performs any initializing required to start the next operation.

Read-Out Control Logic 38 also provides a "start" signal to gate 42 to preload the programmed distance data D from store 4 into Termination Logic 8. Further, it provides a "clear" signal via line 44 to the Constant Acceleration Generator 10, which signal resets the Constant Acceleration Generator so that the latter is always in a cleared condition at the start of a new positioning operation.

CONSTANT ACCELERATION GENERATOR 10 (FIG. 3)

Figure 3:
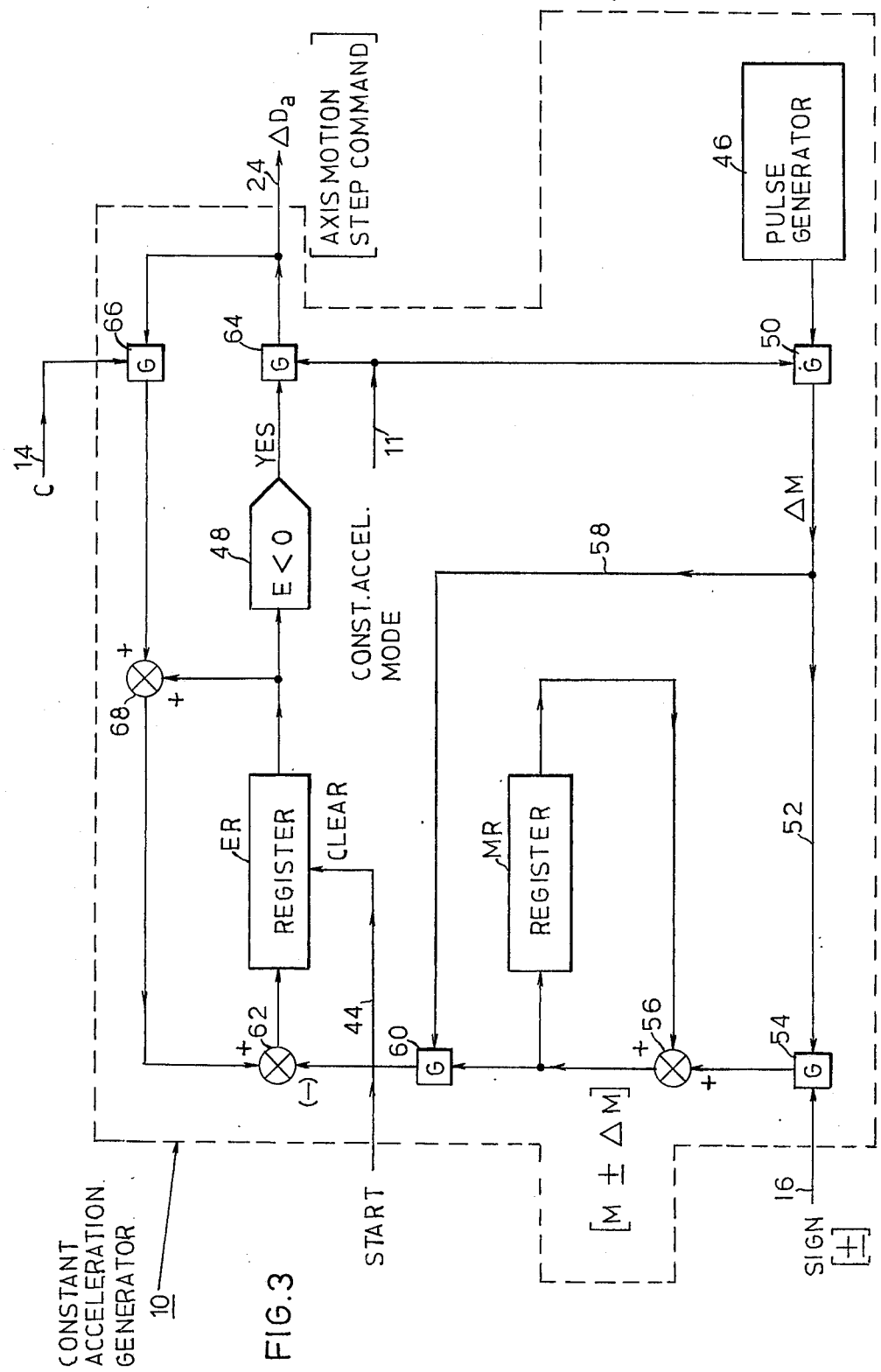
FIG. 3 is a block diagram of the Constant Acceleration Generator used in the system of FIG. 1.

The Constant Acceleration Generator 10 is shown more particularly in FIG. 3. It includes a pulse generator 46 producing pulses ΔM at a predetermined pulse repetition rate. As will be shown below, a simplification results if the rate of the ΔM pulses is the same as of the ΔDv pulses from the Constant Velocity Generator 12.

Pulses ΔM from generator 46 are fed to a summing register MR so that the contents of the latter register are the algebraic sum of the ΔM pulses. A sign signal is supplied via line 16 from the Acceleration Sign Select Logic 28 to specify whether the ΔM pulses should be added or subtracted in register MR. Addition will result in an acceleration, while a subtraction will result in a deceleration. The contents of register MR are always at zero at the start of a positioning motion. It is incremented in one direction during the acceleration and in the opposite direction in the deceleration, so that it will always return to zero at the end of the positioning motion.

The Constant Acceleration Generator 10 further includes an error register ER which is cleared via line 44 at the start of the programmed motion. After that, the contents of the error register ER reflect the results of a series of additions and subtractions. Subtracted from the error register is the quantity in register MR whenever a ΔM pulse is present. The acceleration data "C" inputted from line 14 is added to the error register as many times as necessary to maintain its contents zero or positive, the sign of the error register ER being detected by a sign detector 48. Whenever the contents of error register ER are negative, an output pulse is produced on line 24 which constitutes an axis motion command pulse ΔDa; it also causes the value C to be added into the error register ER. This operation repeats until the error register becomes zero or positive, at which time the production of the axis motion command pulses ΔDa ceases until the next subtraction of the quantity in register MR makes the error register ER negative again.

The Constant Acceleration Generator 10 operates as follows:

At the beginning of each programmed motion, register MR is zero (this being its state at the end of the preceding operation); the error register ER is also zero as it is cleared by the "start" signal on line 44.

Assuming a constant-acceleration mode signal is received on line 11 from the Mode Select Logic 6, pulse generator 46 feeds ΔM pulses to summing register MR via gate 50, line 52, gate 54 enabled by a positive signal on line 16 from the Acceleration Sign select Logic 18 and summing point 56. As will be shown later, the sign signal on line 16 is positive during the first or acceleration phase of a programmed motion whereby the ΔM pulses are added in register MR, and is negative in the later or deceleration phase of the programmed motion whereby the ΔM pulses are subtracted from register MR.

With each ΔM pulse, the quantity in register MR is subtracted from error register ER, this being effected via line 58, gate 60 and summing point 62. Sign detector 48 checks the sign of error register ER, and when it is negative, it produces, via gate 64, an axis motion command pulse ΔDa fed to the output line 24. These are the pulses fed to the drive during the acceleration and deceleration phases of the programmed motion.

With each axis motion command pulse ΔDa, the acceleration quantity "C" is added (via line 14, gate 66, and summing points 68, 62) into error register ER tending to make it zero or positive. When error register ER becomes zero or positive, the generation of the ΔDa pulses ceases, until the next ΔM pulses from the pulse generator makes the error register again negative by subtracting the contents of the summing register MR from the contents of the error register ER.

The arrangement described above produces a motion having a constant acceleration characteristic where the constant "C" defines the magnitude of the acceleration. This will be shown more particularly below particularly with respect to the example described in FIG. 10.

MODE SELECT LOGIC 6 (FIG. 4)

Figure 4:
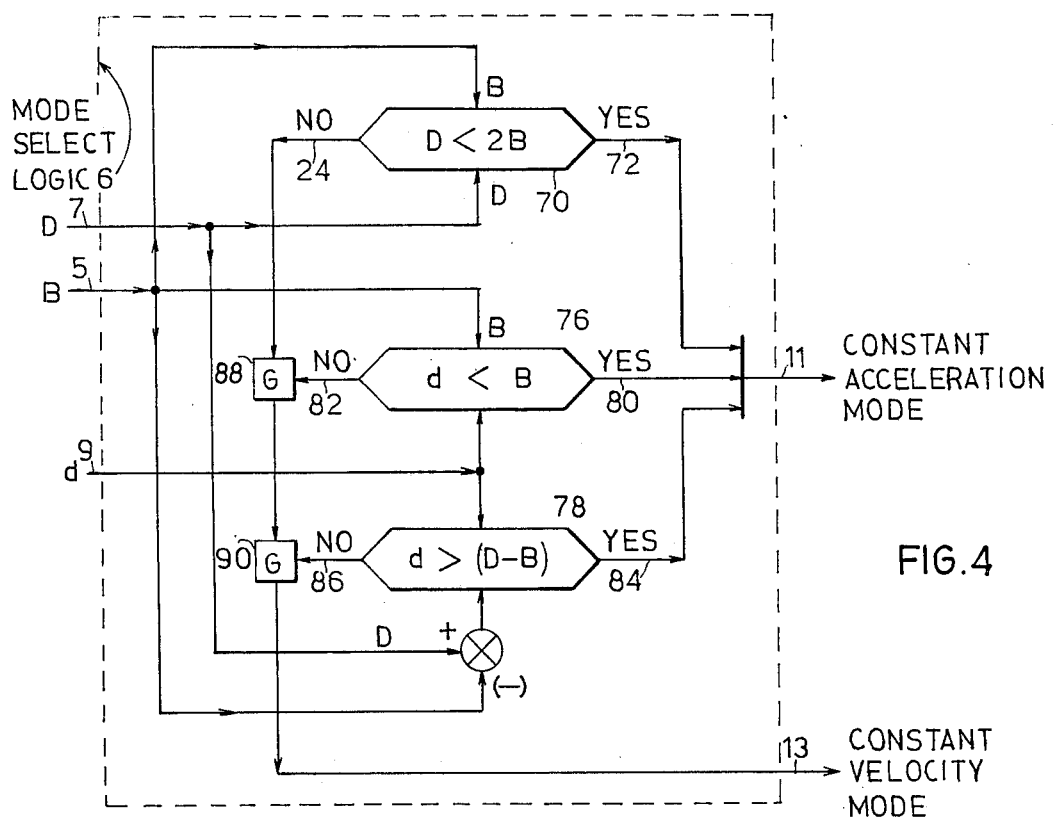
FIG. 4 is a block diagram of the Mode Selection Logic used in the system of FIG. 1.

The Mode Select Logic 6 is shown in FIG. 4. The programmed distance data D and the value "B" defined above are supplied (via lines 7 and 5 respectively) to a comparator 70 which determines whether "D" is less than "2B." If it is, a signal is supplied on its output line 72; and if it is not, a signal is supplied on its output line 74.

In addition, the distance-to-go "d" (computed in Termination Logic 9 in a manner to be described below) is fed to two other comparators, 76 and 78. In comparator 76, the value "d" is compared to "B." If it is found to be less than "B," an output signal is supplied on line 80 whereas it is found to be greater than "B", and output signal is supplied on line 82. In comparator 78, the distance-to-go "d" is compared to "D" - "B", and if it is found to be greater, an output signal is supplied on line 84, whereas if it is found to be less, an output signal is supplied on line 86.

Lines 72, 80 and 84 are all directly connected to line 11, on which appears the Constant Acceleration Mode signal; whereas lines 74, 82 and 86 are all connected via gates 88, 90, to line 13, on which appears the Constant Velocity Mode signal.

From the foregoing it will be appreciated that a Constant Acceleration Mode signal will appear on line 11 if a signal appears on any one of lines 72, 80, 84. That is to say, the Mode Select Logic 6 will enable the Constant Acceleration Generator 10 to generate the motion command pulses $\Delta Da$ at all times except where the programmed distance "D" is more than twice "B" (determined by comparator 70), and the computed distance "d" is more than "B" but less than "D-B" (determined by comparators 76 and 78 respectively). During such times, no Constant Acceleration Mode signal will appear on line 11, thereby disabling the Constant Acceleration Generator 10, but rather a Constant Velocity Mode signal will appear on line 13, thereby enabling the Constant Velocity Generator 12.

ACCELERATION SIGN SELECT LOGIC 18 (FIG. 5)

Figure 5:
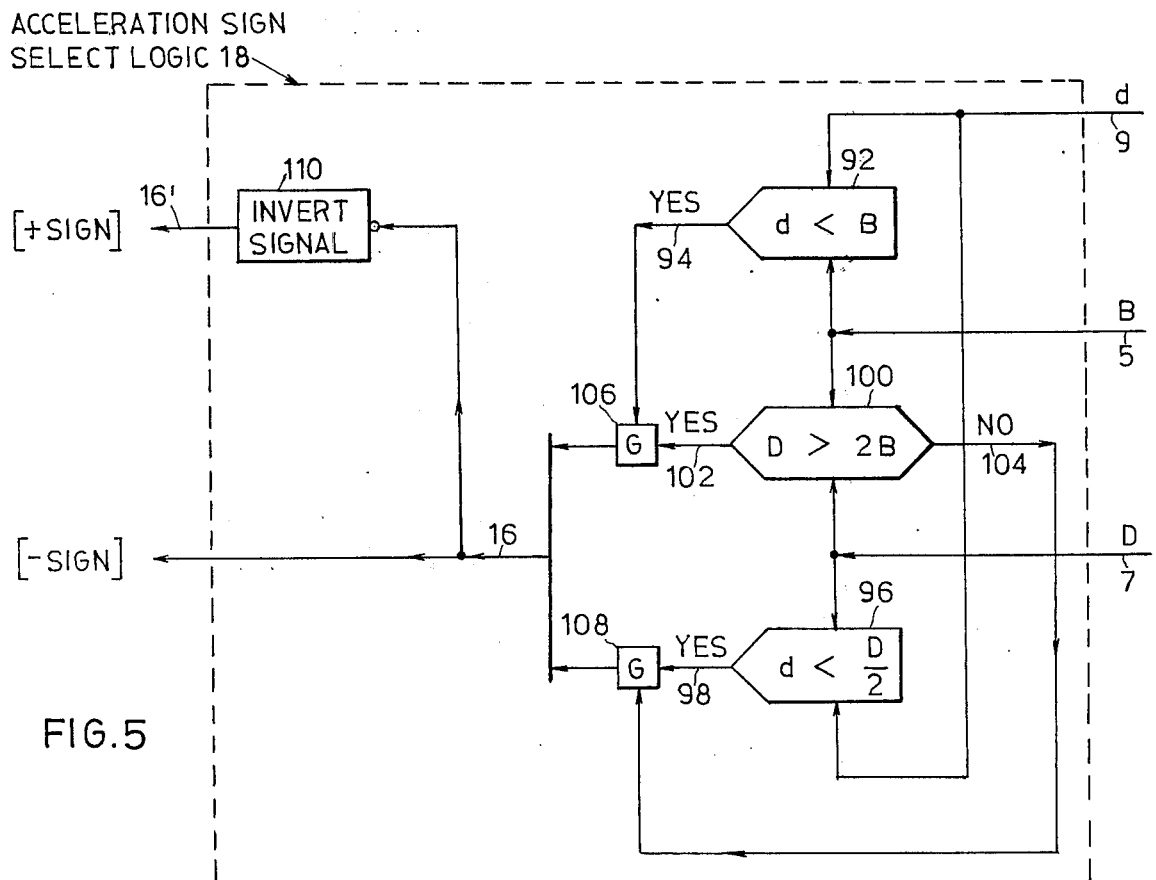
FIG. 5 is a block diagram of the Acceleration Sign Select Logic used in the system of FIG. 1.

FIG. 5 illustrates the Acceleration Sign Select Logic 18. The distance-to-go "d" supplied via line 9 is compared in comparator 92 with the value "B", and where "d" is less, a signal is produced on output line 94. In addition, the distance-to-go "d" is compared with one-half the programmed distance "D" in comparator 96, and if it is found to be less, an output signal is produced on line 98. Further, the programmed distance "D" is compared in comparator 100 with twice the value "B," and if found to be greater, an output signal is produced on line 102, whereas if it is found to be equal or less, an output signal is produced on line 104.

An output signal on both lines 94 and 102 will (via gate 106) produce an output signal on line 16; and similarly, an output signal on both lines 98 and 104 will (via gate 108) produce an output signal on line 16. The signal on line 16 is normally of negative sign to produce a deceleration operation, and the absence of a negative signal indicates a positive signal output to command an acceleration operation, this being schematically indicated by the provision of inverter 110.

From the foregoing, it will be seen that a minus signal producing a deceleration operation will result whenever: (1) the programmed distance "D" is greater than twice the distance "B" (comparator 100), and in addition the ditsnce-to-go "d" is less than the distance "B" (comparator 92); or (2) the programmed distance "D" is less than twice the distance "B" (comparator 100), and also the distance-to-go "d" is less than one-half the programmed distance "D" (comparator 96).

CONSTANT VELOCITY GENERATOR 12 (FIG. 6)

Figure 6:
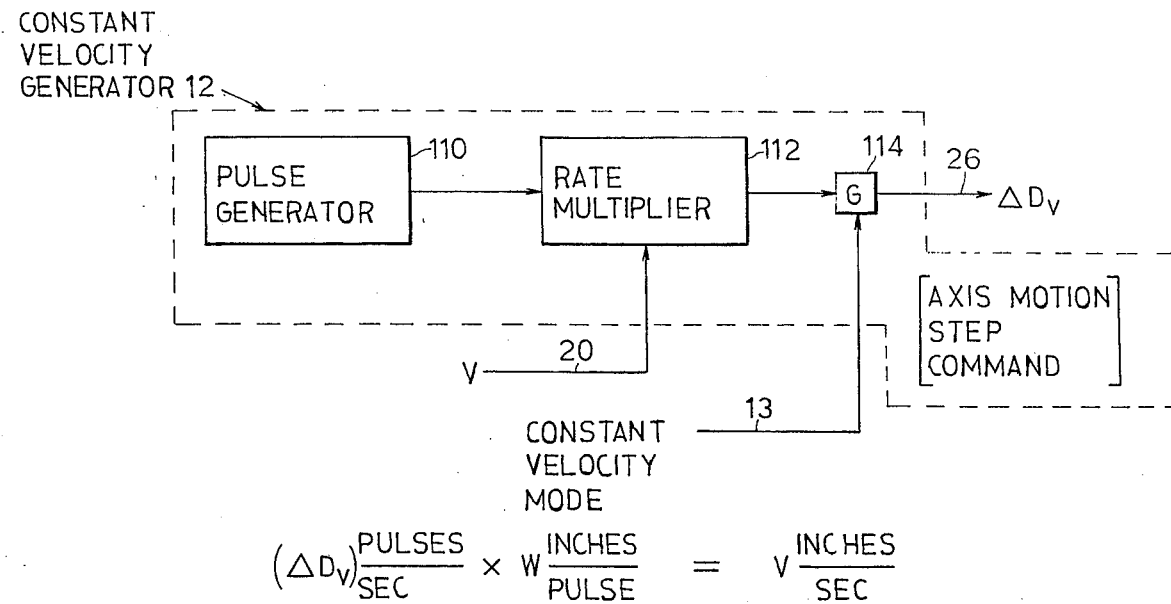
FIG. 6 is a block diagram of the Constant Velocity Generator used in the system of FIG. 1.

The Constant Velocity Generator 12 is shown in FIG. 6. It receives the programmed velocity data "V" via line 20, and the Constant Velocity Mode signal from Mode Select Logic 6 via line 13, and produces a series of digital pulses $\Delta Dv$ on line 26. The latter pulses constitute the axis motion command pulses supplied to the drive when the system is operating according to the Constant Velocity Mode.

Each $\Delta Dv$ pulse represents the command to the axis drive to move a step of motion, which step depends on the resolution of the axis drive system. The rates of the resultant commanded motion must be at the prescribed velocity "V," which has been established as the fastest that is desired. A number of different approaches are available that will satisfy the logic needs of this type of system.

FIG. 6 illustrates but one method for providing the necessary $\Delta Dv$ pulses. It includes a fixed frequency pulse generator 110 which produces pulses at a rate higher than will be needed. This may be crystal-controlled if great accuracy is desired, although generally there will be no need for high precision for this frequency. A rate multiplier 112, which may be one of the integrated-circuit units commercially available today, is used to produce an output which is the product of the fixed frequency and the digital number "V" supplied via line 20. The output of rate multiplier 112 is gated via gate 114 by the Constant Velocity Mode signal supplied on line 13 from the Mode Select Logic 6, to produce the axis motion command pulses $\Delta Dv$.

The rate of generation of the $\Delta Dv$ pulses is preferably to be the same as that of the $\Delta M$ pulses in the Constant Acceleration Generator 10 in order to simplify the circuits involved.

From the foregoing, it will be seen that whenever the Constant Acceleration Generator 10 is enabled by Mode Select Logic 6, the $\Delta Da$ pulses produced by that generator will appear on output line 28 as the axis motion command pulses $\Delta D$ supplied to the drive, whereas if the Constant Velocity Generator 12 is enabled, its output pulses $\Delta Dv$ will appear on output line 28 as the axis motion command pulses.

The $\Delta D$ pulses appearing on line 28 are supplied to the axis drive for effecting the positioning movement, and in addition, are supplied via line 30 to Termination Logic 8.

TERMINATION LOGIC 8 (FIG. 7)

Figure 7:
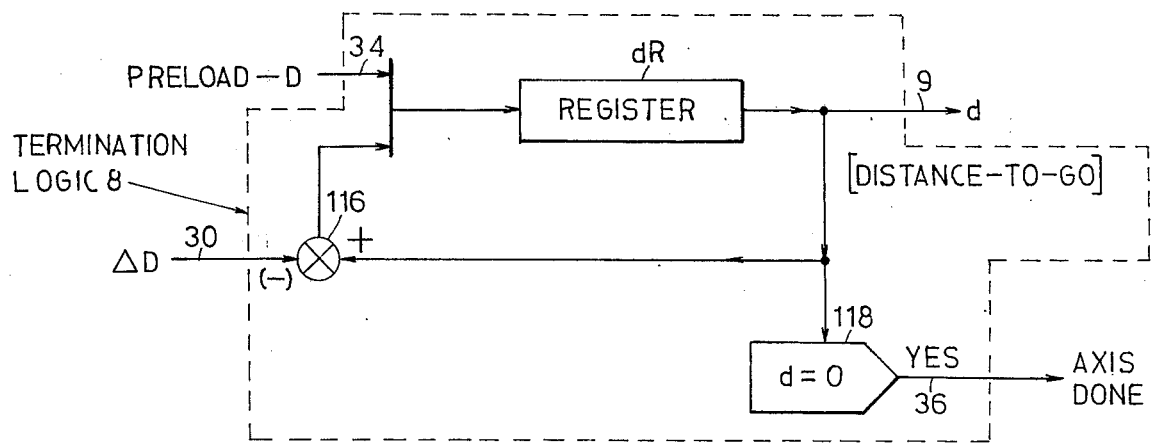
FIG. 7 is a block diagram of the Termination Logic used in the system of FIG. 1.

Termination Logic 8 is shown in FIG. 7. It is preloaded with the programmed distance D via line 34, which distance is stored in its register dR. The axis motion command pulses $\Delta D$ appearing on its input line 30 are subtracted, via summing point 116, from the programmed distance D preloaded into register dR, so that the quantity in that register is always the distance-to-goal "d." This value appears on output line 9.

A zero detector 118 continuously monitors the value "d" in register "dR", and when it is zero, it produces an "axis done" signal on output line 36. As indicated above with respect to the description of FIG. 1, when an "axis-done" signal is produced with respect to all the axes, this is conveyed to the Program-Read-Out Control Logic 38, causing the latter to initiate a new operation.

OPERATION OF SYSTEM OF FIGS. 1–7

The operation of the system illustrated in FIG. 1–7 will be apparent from the foregoing description. The maximum acceleration of the system is prescribed by quantity "C," and the maximum velocity is prescribed by quantity "V," both of which are stored in data store 2. From the latter data, there is established the value "B," which corresponds to the distance to be traversed by the article when accelerated at the prescribed maximum acceleration from zero velocity to the prescribed maximum velocity.

The foregoing information is introduced, together with the programmed distance D from data store 4, into Mode Select Logic 6, which determines whether the system is to operate according to the Constant Acceleration Mode or according to the Constant Velocity Mode. If according to the Constant Acceleration Mode, an enabling signal is produced on line 11 enabling the Constant Acceleration Generator 10 to produce a series of outpt pulses $\Delta Da$ constituting the axis motion command pulses $\Delta D$; and if a Constant Velocity Mode operation is determined, an enabling signal is produced on output line 13 enabling Constant Velocity Generator 12 to produce the digital pulses $\Delta Dv$ constituting the axis motion command pulses $\Delta D$. Acceleration Sign Select Logic 18 also receives the foregoing data, and in addition, receives the distance-to-go "$d$" computed in Termination Logic 8, and produces an output signal on line 16 the sign of which causes the Constant Acceleration Generator 10 to operate according to an acceleration operation or a deceleration operation.

The axis motion command pulses $\Delta D$ appearing on line 28 are supplied to the axis drive, and in addition, to Termination Logic 8 which computes the distance-to-go "$d$." When "$d$" is zero, the operation is completed for that axis, and an "axis done" signal is produced on line 36 to the Read-Out Control Logic 38 telling it to start a new program read-out operation.

It will thus be seen that the digital system illustrated in FIGS. 1–7 produces a precisely controlled motion consisting of an acceleration at a constant maximum rate, a maximum velocity, and a deceleration at the constant maximum rate until the article is moved to the programmed position, at which time the velocity is zero. The acceleration and peak velocity are at prescribed values, and to keep the positioning time to a minimum, the largest possible values are assigned to these parameters consistent with what the system is capable of withstanding.

VARYING THE ACCELERATION AND DECELERATION

As indicated earlier, one of the limitations in a positioning system is that the inertia force produced by the acceleration must be within the mechanical stress safety limits and the drive motor capability. But these forces are also dependent on the weight as well as the acceleration of the moving members. A given drive system will be able to move lighter weights with greater acceleration than heavier ones. If the weight of what is to be positioned does not always remain the same, but can vary considerably, then it would be desirable to provide for changing the value of "$c$" which determines the commanded acceleration. Otherwise the acceleration would have to be established at a low value sufficient to suit the heaviest object that may have to be positioned, while objects of lesser weight will take longer to be moved than need be. Thus it is desirable for some applications to be able to vary the acceleration. This can be accomplished in a number of different ways.

One way of varying the acceleration to accommodate different loads, is to identify the different loads and store a value of "C" in the memory for that particular load. The identification can be from a coded number read from the workpiece, tote box or pallet entered by the operator by a selector switch or a keyboard. A drawback of this method is that it will require considerable hardware or memory capacity for storing the required information, and moreover, it could handle only those objects for which advanced preparation had been made.

Another manner of accommodating different objects to be positioned would be to weight the object, for example by a load-cell prior to the programmed motion, and either compute or extract from a store the appropriate quantity "C" for that weight. The disadvantages mentioned in the preceding paragraph would also apply to some extent to this approach.

SYSTEM OF FIG. 8

Figure 8:
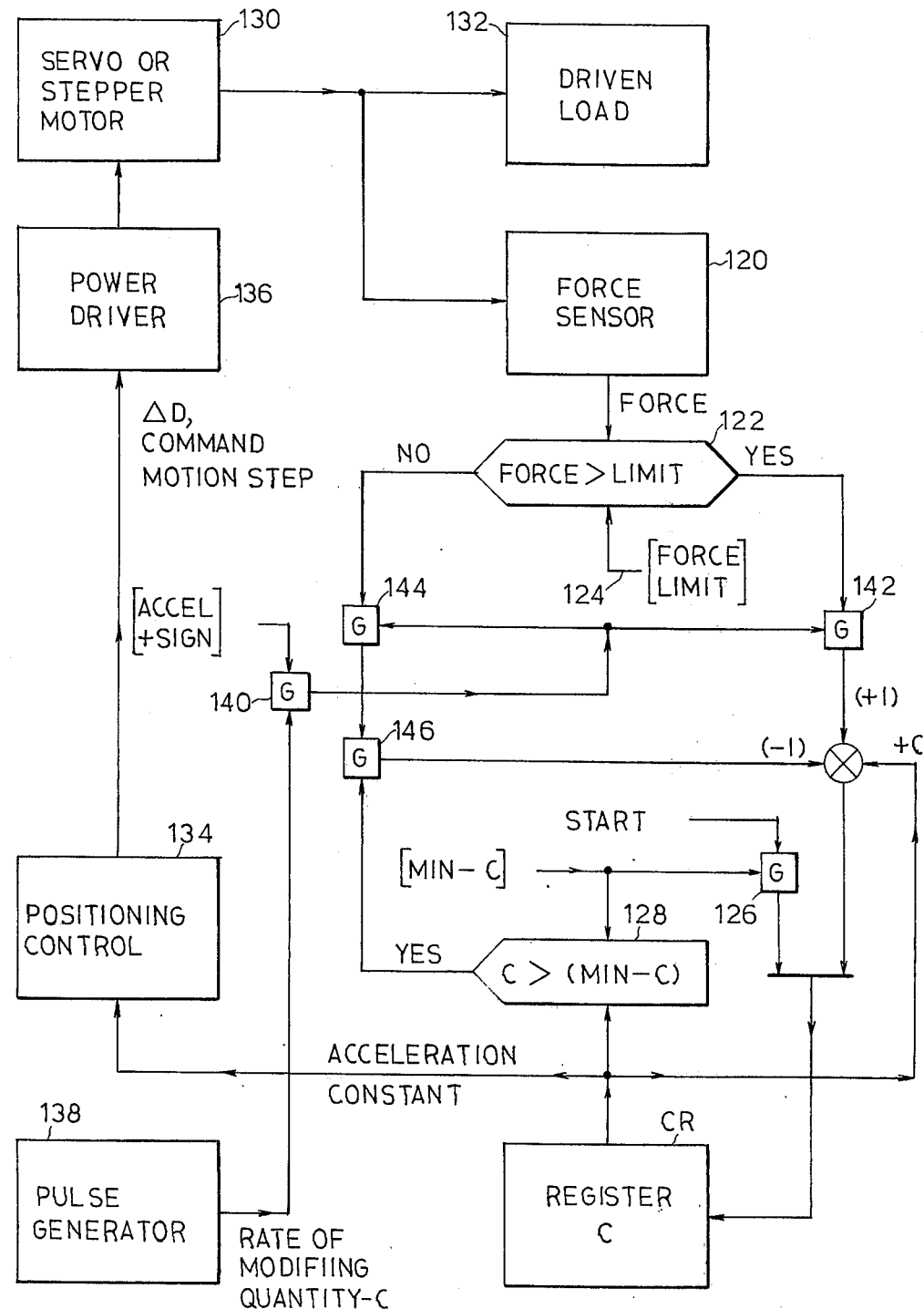
FIG. 8 is a block diagram of a digital adaptive acceleration control system constructed in accordance with the invention.

FIG. 8 illustrates another arrangement that could be used for varying the acceleration data "C" to monitor the inertia forces. In the system of FIG. 8, a force-sensor 120 is used to monitor the inertia forces, and produces an output to a comparator 122 which compares the sensed force with a limit force prescribed by input line 124.

In the system of FIG. 8, the maximum acceleration data "C" is stored in register "CR". In this case, the quantity "C" is inversely proportional to the acceleration that it will produce; thus, to decrease the acceleration, the quantity "C" must be increased in value.

The system of FIG. 8 establishes a limit as to the maximum acceleration attainable, by not allowing the quantity "C" to go below a value of "MIN-C". The latter quantity is set at a value that will not cause the acceleration of light-weight objects to be excessive. The "MIN-C" value is fed into register CR via gate 126 at the start of the programmed operation. This value is also fed to a comparator 128 which continuously checks to see whether the value "C" is greater than the "MIN-C" value.

The system of FIG. 8 operates as follows:

The servo or stepper motor 130 continuously drives the load 132 at the constant acceleration prescribed by the value "C" which is stored in register CR and which is fed to the Positioning Control system 134. The latter system provides the axis motion command pulses $\Delta D$ to the Power Drive 136 as described above. Register CR, which controls the acceleration of the Positioning Control system 134, is loaded with the "MIN-C" data at the start of the programmed motion, via gate 126.

A pulse generator 138 supplies the pulses for modifying the quantity "C" in register CR. The output of pulse generator 138 is applied to a gate 140 which gate, when enabled by the acceleration enabling signal, produces $\Delta C$ pulses which are supplied to a pair of gates 142, 144 at the two output ends of comparator 122.

Whenever the force sensed by sensor 120 is greater than the limit, as determined by comparator 122, gate 142 is opened to add a ΔC pulse to register C, thereby increasing the value in the register and decreasing the acceleration. On the other hand, when the sensed force is less than the force limit, gate 144 is opened rather than gate 142. If at the time gate 144 is opened, the "C" value in register CR is greater than the initial "MIN-C" value, gate 146 is opened and a ΔC pulse is subtracted from the value in register CR, thereby decreasing the "C" value therein, and increasing the acceleration.

SYSTEM OF FIG. 9

Figure 9:
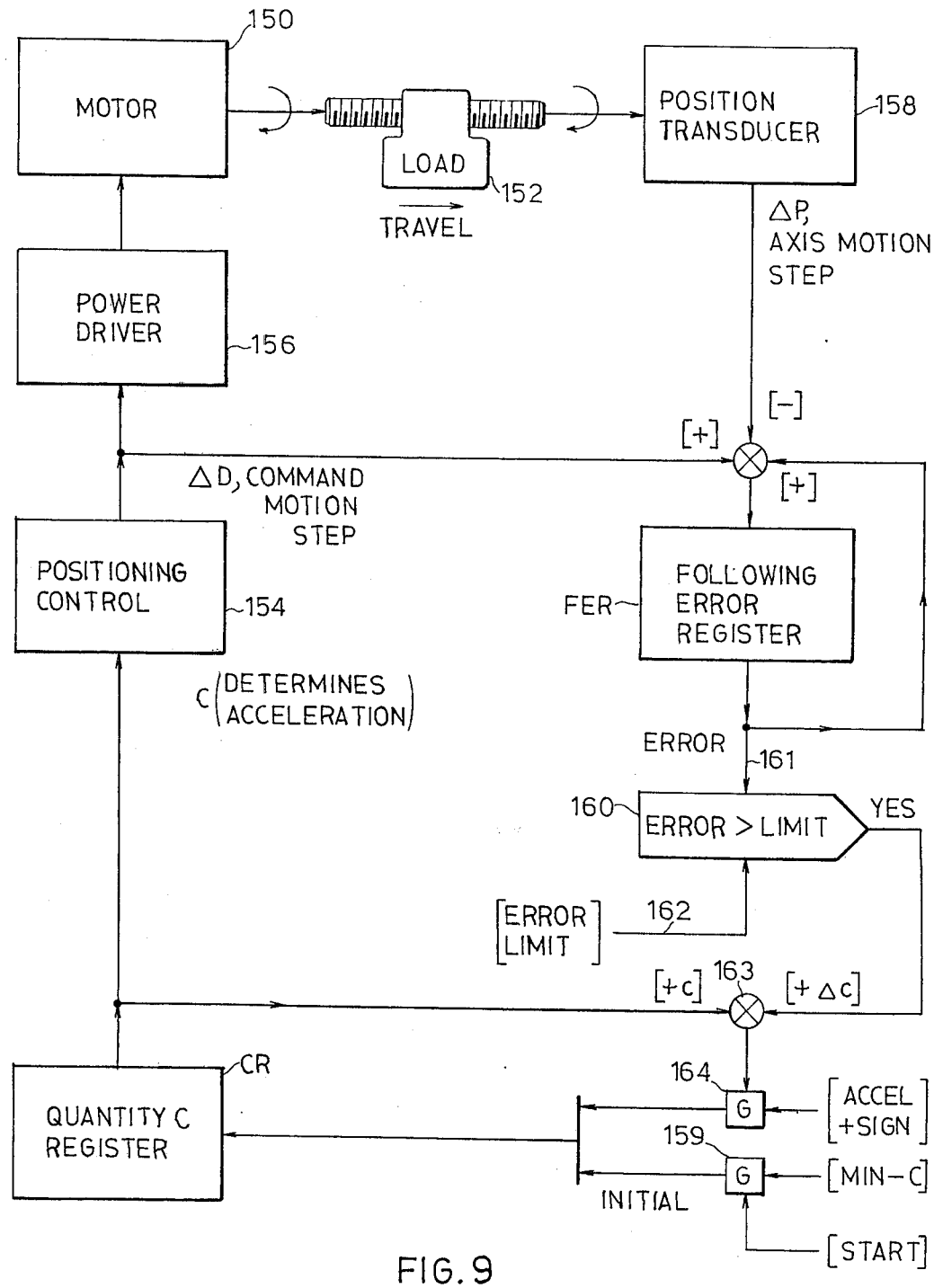
FIG. 9 is a block diagram of a digital overload detector adaptive acceleration control system constructed in accordance with the invention.

FIG. 9 illustrates another system for automatically adapting the value of the acceleration to suit the capability of the motor to drive the load. The system of FIG. 9 is based on monitoring the following-error, i.e., the difference between the actual and the commanded positions of the load. A digital signal indicating the value of the following-error will often be available from the drive system itself, but if not available, the necessary hardware (a number of which are known) can be provided.

In the system of FIG. 9, the motor 150 drives the load 152 in accordance with Positioning Control system 154 which provides the command motion pulses ΔD supplied to the power drive 156 for driving the motor. The Positioning Control system 154 receives the acceleration data "C," which is normally stored in a register CR, and supplies the motion command pulses ΔD to the power drive 156 for driving the motor 150.

The motion command pulses ΔD are also fed to a following-error register FER, where they are accumulated to thereby provide an indication in that register of the commanded position of the load. The actual position of the load is determined by position transducer 158, which supplies actual-position pulses ΔP to following-error register FER, being subtracted from that register. The output of the following-error register thus represents the following-error between the commanded and actual positions.

The C-register CR is preloaded with the "MIN-C" data at the start of the operation via gate 159.

A comparator 160 receives this following-error in one input 161 and compares it with "error-limit" information supplied through another input 162. If the following-error is greater than the limit, an output signal is applied to summing point 163 to thereby add a ΔC acceleration pulse via gate 164 to the C-register CR. This increases the value in register CR, thereby reducing the acceleration of the motor drive as explained above.

The system of FIG. 9 operates as follows:

Prior to the start of the positioning motion, the quantity "C" is initialized at a value of "MIN-C," via gate 159 which provides the maximum acceleration that is desired. If the force required to overcome the inertia of the load at that commanded acceleration is greater than the drive motor can supply, the actual position will not keep up with the commanded position, and the following-error will increase. Generally, the drive system will be arranged to accommodate a limited amount of following-error; beyond that limit the drive system may lose track of the position, and the motion may be uncontrolled. Should the situation continue of a commanded acceleration calling for a motor drive response greater than can be produced, the operating limits of the following error will be exceeded.

An operating limit for the following-error is established by comparator 160 to provide the required margin of safety. If during the acceleration portion of the motion, the following-error should exceed that operating limit, the quantity in register CR is increased via gate 164, which thereby reduces the commanded acceleration. The commanded acceleration will continue to be reduced until the following-error becomes less than the operating limit. When this is done, the value of the commanded acceleration established by the quantity "C" will have been made slightly less than the actual acceleration capability available from the drive system for that particular inertia and friction loads that are present for that motion.

After the acceleration to the prescribed peak velocity is complete, the value of "C" will be kept unchanged. Its value will determine the precise distance from the programmed end point to initiate the slow-down. It will also determine the value of the constant deceleration to cause the motion commanded to be completed with a zero velocity.

It should be noted that the drive motor for a given inertia load can decelerate quicker than it can accelerate. The reason for this is that during acceleration the friction load will reduce the drive system force available to increase the velocity, while during deceleration, the friction adds to the force supplied by the motor to help slow-down the velocity. The significance of that fact is that the value of "C" determined so as to match the acceleration capabilities of the drive, is thereby assured of being adequate for that drive system to follow the deceleration as commanded.

EXAMPLE (FIG. 10)

Figure 10:
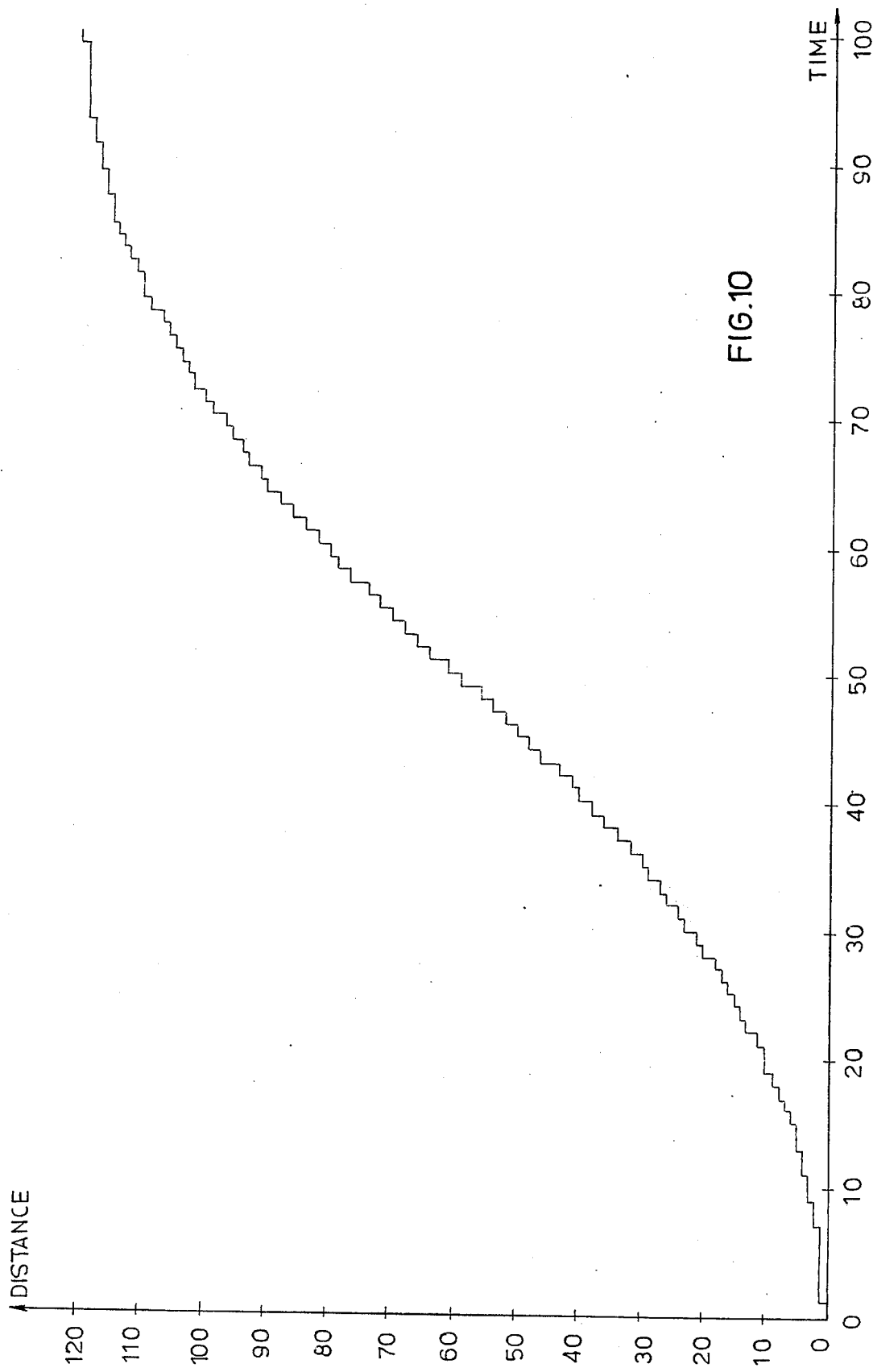
FIG. 10 is a chart illustrating the movement effected by a positioning system in accordance with the invention.

FIG. 10 illustrates one example of the trace generated by the novel positioning system having constant acceleration and deceleration.

This example has the following parameters:

C = 21

Acceleration, (+ ΔM), range of distance:

$$0 \leq D < 60$$

Deceleration, (− ΔM), range of distance:

$$60 \leq D < 120$$

T = unit of time

T = Σ/Δ/

The algorithms that follow state the logic operations shown in FIG. 3 that result in the constant acceleration operation.

(1) $E_{OLD} + (\Delta Da) \cdot C - (\Delta M) \cdot M = E_{NEW}$ (2) $M = \Sigma(\Delta M) \cdot S_a$ (3) $\Delta D_a = (D<O)$ Here:

$\Delta D_a$ = the axis motion command pulse generated by this logic

ΔM = timing pulse supplied at a fixed frequency $S_a$ = acceleration sign, plus for acceleration and minus for deceleration C = constant which determines the value of the acceleration M = number of timing pulses produced during the acceleration from zero to the current velocity. During deceleration it is the number of timing pulses that will be produced as the velocity goes from its current value to zero at the motion end-point. The velocity is the commanded value.

For convenience in the tabulating of the example, the control algorithm is arranged in the following form:

$$E_2 - (\Delta M) \cdot M = E_1$$

$$E_1 + (\Delta Da) \cdot C = E_2$$

The value of "M", the number of time units at which the deceleration will begin can be determined from eqn. (4)

$$d = \frac{m^2 + m}{2C} \tag{4}$$

Here
$$d = 60$$
$$C = 21$$
$$m = ?$$

Solving, we have:
$$m^2 + m - 2520 = 0$$

$$m = 49.7029$$

or to the nearest integer, M = 50, the point deceleration starts. That value will be used to compute the exact value of "D"

$$D = \frac{m^2}{2C} \text{ (for acceleration)} \tag{6}$$

or derived from eqn. (6)

$$\frac{D1}{D2} = \left(\frac{M_1}{M_2}\right)^2$$

Here, we will let $D_1$ and $M_1$ be the current point and the quantities $D_2$ and $M_2$ be the end point of the acceleration. Then:
$$D_2 = 60$$
$$M_2 = 50 \text{ (see above)}$$

$$\frac{D_1}{ACCEL} = M_1^2 \left(\frac{60}{50^2}\right) = 0.024\, M_1^2 \tag{7}$$

Next needed is the formula to compute the position during the deceleration, in this example the total distance is 120. As the M-quantity is symmetrical as it is measured from the starting point for acceleration and from the end-point for deceleration, therefore the following formula can be written:

$$\frac{D_1}{DECEL} = 120 - 0.024\, M_1^2 \tag{8}$$

Equations (7) and (8) are used to compute the exact position. The error is the difference between the generated and the computed position, "D." Note that on the average the error is well below one unit of position. That indicates the precise accuracy at which this novel positioning system generates a constant acceleration and deceleration.

It will be seen that the foregoing algorithms, and the acceleration control system described above operating in accordance therewith, could be used in other systems for coordinating a first quantity to a second quantity and a third quantity so that the first quantity varies according to the square of the second quantity at a rate according to the third quantity. In the acceleration control system described, the first quantity is distance, the second quantity is time, and the third quantity is the desired rate of acceleration, which can be constant or variable as described above. However, such a system could be used in other applications, for example where the second quantity is units of distance or of angular rotation, and the third quantity is a constant or variable quantity.

Many other variations, modifications and applications of the illustrated embodiments will be apparent.

| | | GENERATED | | | | COMPUTED | |
|---|---|---|---|---|---|---|---|
| T | M | $E_1$ | $\Delta D$ | $\Sigma E\Delta D$ | $E_2$ | $\Sigma E\Delta D$ | Error |
| 0 | 0 | 0 | 0 | 0 | 0 | | |
| 1 | 1 | −1 | 1 | 1 | 20 | 0.024 | −0.976 |
| 2 | 2 | 18 | 0 | | | | |
| 3 | 3 | 15 | 0 | | | | |
| 4 | 4 | 11 | 0 | | | | |
| 5 | 5 | 6 | 0 | | | | |
| 6 | 6 | 0 | 0 | | | 0.864 | −0.136 |
| 7 | 7 | −7 | 1 | 2 | 14 | 1.176 | −0.824 |
| 8 | 8 | 6 | 0 | | | 1.536 | −0.464 |
| 9 | 9 | −3 | 1 | 3 | 18 | 1.944 | −1.056 |
| 10 | 10 | 8 | 0 | | | 2.400 | −0.600 |
| 11 | 11 | −3 | 1 | 4 | 18 | 2.904 | −1.096 |
| 12 | 12 | 6 | 0 | | | 3.456 | −0.544 |
| 13 | 13 | −7 | 1 | 5 | 14 | 4.056 | −0.944 |
| 14 | 14 | 0 | 0 | | | 4.704 | −0.296 |
| 15 | 15 | −15 | 1 | 6 | 6 | 5.400 | −0.600 |
| 16 | 16 | −10 | 1 | 7 | 11 | 6.144 | −0.856 |
| 17 | 17 | −6 | 1 | 8 | 15 | 6.936 | −0.064 |
| 18 | 18 | −3 | 1 | 9 | 18 | 7.776 | −1.224 |
| 19 | 19 | −1 | 1 | 10 | 20 | 8.664 | −1.336 |
| 20 | 20 | 0 | 0 | | | 9.600 | −0.400 |
| 21 | 21 | −21 | 1 | 11 | 0 | 10.584 | −0.416 |
| 22 | 22 | −22 | 1 | 12 | −1 | 11.616 | −0.384 |
| | | | 1 | 13 | 20 | | |
| 23 | 23 | −3 | 1 | 14 | 18 | 12.696 | −1.304 |
| 24 | 24 | −6 | 1 | 15 | 15 | 13.824 | −1.176 |
| 25 | 25 | −10 | 1 | 16 | 11 | 15.000 | −1.000 |

-continued

| | GENERATED | | | | | COMPUTED | |
|---|---|---|---|---|---|---|---|
| 26 | 26 | −15 | 1 | 17 | 6 | 16.224 | −0.776 |
| 27 | 27 | −21 | 1 | 18 | 0 | 17.496 | −0.504 |
| 28 | 28 | −28 | 1 | 19 | −7 | 18.816 | −0.184 |
| | | | 1 | 20 | 14 | | |
| 29 | 29 | −15 | 1 | 21 | 6 | 20.184 | −0.816 |
| 30 | 30 | −24 | 1 | 22 | −3 | 21.600 | −0.400 |
| | | | 1 | 23 | 18 | | |
| 31 | 31 | −13 | 1 | 24 | 8 | 23.064 | −0.936 |
| 32 | 32 | −24 | 1 | 25 | −3 | 24.576 | −0.424 |
| | | | 1 | 26 | 18 | | |
| 33 | 33 | −15 | 1 | 27 | 6 | 26.136 | −0.864 |
| 34 | 34 | −28 | 1 | 28 | −7 | 27.744 | −0.256 |
| | | | 1 | 29 | 14 | | |
| 35 | 35 | −21 | 1 | 30 | 0 | 29.400 | −0.600 |
| 36 | 36 | −36 | 1 | 31 | −15 | 31.104 | +0.104 |
| | | | 1 | 32 | 6 | | |
| 37 | 37 | −31 | 1 | 33 | −10 | 32.856 | −0.144 |
| | | | 1 | 34 | 11 | | |
| 38 | 38 | −27 | 1 | 35 | −6 | 34.656 | −0.344 |
| | | | 1 | 36 | 15 | | |
| 39 | 39 | −24 | 1 | 37 | −3 | 36.504 | −0.496 |
| | | | 1 | 38 | 18 | | |
| 40 | 40 | −22 | 1 | 39 | −1 | 38.400 | −0.600 |
| | | | 1 | 40 | 20 | | |
| 41 | 41 | −21 | 1 | 41 | 0 | 40.344 | −0.656 |
| 42 | 42 | −42 | 1 | 42 | −21 | 42.336 | +0.336 |
| | | | 1 | 43 | 0 | | |
| 43 | 43 | −43 | 1 | 44 | −22 | 44.376 | +0.376 |
| | | | 1 | 45 | −1 | | |
| | | | 1 | 46 | 20 | | |
| 44 | 44 | −24 | 1 | 47 | −3 | 46.464 | −0.536 |
| | | | 1 | 48 | 18 | | |
| 45 | 45 | −27 | 1 | 49 | −6 | 48.600 | −0.400 |
| | | | 1 | 50 | 15 | | |
| 46 | 46 | −31 | 1 | 51 | −10 | 50.784 | −0.216 |
| | | | 1 | 52 | 11 | | |
| 47 | 47 | −36 | 1 | 53 | −15 | 53.016 | +0.016 |
| | | | 1 | 54 | 6 | | |
| 48 | 48 | −42 | 1 | 55 | −21 | 55.296 | +0.296 |
| | | | 1 | 56 | 0 | | |
| 49 | 49 | −49 | 1 | 57 | −28 | 57.624 | +0.624 |
| | | | 1 | 58 | −7 | | |
| | | | 1 | 59 | 14 | | |
| 50 | 50 | −36 | 1 | 60 | −15 | 60.000 | 0.000 |
| | | | 1 | 61 | 6 | | |
| 51 | 49 | −43 | 1 | 62 | −22 | 62.376 | 0.376 |
| | | | 1 | 63 | −1 | | |
| | | | 1 | 64 | 20 | | |
| 52 | 48 | −28 | 1 | 65 | −7 | 64.704 | −0.296 |
| | | | 1 | 66 | 14 | | |
| 53 | 47 | −33 | 1 | 67 | −12 | 66.984 | −0.016 |
| | | | 1 | 68 | 9 | | |
| 54 | 46 | −37 | 1 | 69 | −16 | 69.216 | 0.216 |
| | | | 1 | 70 | 5 | | |
| 55 | 45 | −40 | 1 | 71 | −19 | 71.400 | 0.400 |
| | | | 1 | 72 | 2 | | |
| 56 | 44 | −42 | 1 | 73 | −21 | 73.536 | 0.536 |
| | | | 1 | 74 | 0 | | |
| 57 | 43 | −43 | 1 | 75 | −22 | 75.624 | 0.624 |
| | | | 1 | 76 | −1 | | |
| | | | 1 | 77 | 20 | | |
| 58 | 42 | −22 | 1 | 78 | −1 | 77.664 | −0.336 |
| | | | 1 | 79 | 20 | | |
| 59 | 41 | −21 | 1 | 80 | 0 | 79.656 | −0.344 |
| 60 | 40 | −40 | 1 | 81 | −19 | 81.600 | 0.600 |
| | | | 1 | 82 | 2 | | |
| 61 | 39 | −37 | 1 | 83 | −16 | 83.496 | 0.496 |
| | | | 1 | 84 | 5 | | |
| 62 | 38 | −33 | 1 | 85 | −12 | 85.344 | 0.344 |
| | | | 1 | 86 | 9 | | |
| 63 | 37 | −28 | 1 | 87 | −7 | 87.144 | 0.144 |
| | | | 1 | 88 | 14 | | |
| 64 | 36 | −22 | 1 | 89 | −1 | 88.896 | −0.104 |
| | | | 1 | 90 | 20 | | |
| 65 | 35 | −15 | 1 | 91 | 6 | 90.600 | −0.400 |
| 66 | 34 | −28 | 1 | 92 | −7 | 92.256 | 0.256 |
| | | | 1 | 93 | 14 | | |
| 67 | 33 | −19 | 1 | 94 | 2 | 93.864 | −0.136 |
| 68 | 32 | −30 | 1 | 95 | −9 | 95.424 | 0.424 |
| | | | 1 | 96 | 12 | | |
| 69 | 31 | −19 | 1 | 97 | 2 | | |
| 70 | 30 | −28 | 1 | 98 | −7 | 98.400 | 0.400 |
| | | | 1 | 99 | 14 | | |
| 71 | 29 | −15 | 1 | 100 | 6 | 99.816 | −0.184 |
| 72 | 28 | −22 | 1 | 101 | −1 | 101.184 | 0.184 |
| | | | 1 | 102 | 20 | | |
| 73 | 27 | −7 | 1 | 103 | 14 | 102.504 | −0.496 |
| 74 | 26 | −12 | 1 | 104 | 9 | 103.776 | −0.224 |
| 75 | 25 | −16 | 1 | 105 | 5 | 105.000 | 0.000 |
| 76 | 24 | −19 | 1 | 106 | 2 | 106.176 | 0.176 |
| 77 | 23 | −21 | 1 | 107 | 0 | 107.304 | 0.304 |

-continued

| GENERATED | | | | | | COMPUTED | |
|---|---|---|---|---|---|---|---|
| 78 | 22 | −22 | 1 | 108 | −1 | 108.384 | 0.384 |
|    |    |     | 1 | 109 | 20 |         |       |
| 79 | 21 | −1  | 1 | 110 | 20 | 109.416 | −0.584 |
| 80 | 20 | 0   | 0 |     |    | 110.400 |       |
| 81 | 19 | −19 | 1 | 111 | 2  | 111.336 | 0.336 |
| 82 | 18 | −16 | 1 | 112 | 5  | 112.224 | 0.224 |
| 83 | 17 | −12 | 1 | 113 | 9  | 113.064 | 0.064 |
| 84 | 16 | −7  | 1 | 114 | 14 | 113.856 | −0.144 |
| 85 | 15 | −1  | 1 | 115 | 20 | 114.600 | −0.400 |
| 86 | 14 | 6   | 0 |     |    | 115.296 |       |
| 87 | 13 | −7  | 1 | 116 | 14 | 115.944 | −0.056 |
| 88 | 12 | 2   | 0 |     |    | 116.544 |       |
| 89 | 11 | −9  | 1 | 117 | 12 | 117.096 | 0.096 |
| 90 | 10 | 2   | 0 |     |    | 117.600 |       |
| 91 | 9  | −7  | 1 | 118 | 14 | 118.056 | 0.056 |
| 92 | 8  | 6   | 0 |     |    | 118.464 |       |
| 93 | 7  | −1  | 1 | 119 | 20 | 118.824 | −0.176 |
| 94 | 6  | 14  | 0 |     |    | 119.136 | 0.136 |
| 95 | 5  | 9   | 0 |     |    | 119.400 | 0.400 |
| 96 | 4  | 5   | 0 |     |    |         |       |
| 97 | 3  | 2   | 0 |     |    |         |       |
| 98 | 2  | 0   | 0 |     |    | 119.904 | 0.904 |
| 99 | 1  | −1  | 1 | 120 | 20 | 119.856 | −0.144 |
| 100| 0  |     |   |     |    | 120.000 | 0.000 |

What is claimed is:

1. A programmable positioning system for moving an article a programmed distance, comprising: data input means for inputting the programmed distance data "D," acceleration data relating to a predetermined rate of acceleration, and velocity data relating to a predetermined maximum velocity means for computing the value "B" corresponding to the distance to be traversed by the article when accelerated at said predetermined rate of acceleration from zero velocity to said predetermined maximum velocity; acceleration control means for generating an acceleration electrical signal in the form of a series of pulses representative of said predetermined rate of acceleration; velocity control means for generating a velocity electrical signal in the form of a series of pulses representative of said predetermined maximum velocity; means for continuously computing a distance "d" corresponding to the remaining distance-to-go for the article to reach the programmed distance; and drive control means normally utilizing said predetermined acceleration electrical pulses in driving the article, but utilizing instead said maximum velocity electrical pulses in driving the article whenever the programmed distance "D" is more than twice "B", and the computed distance "d" is more than "B" but less than "D" minus "B".

2. A system as defined in claim 1, wherein said acceleration control means comprises an acceleration generator generating a first series of motion command electrical pulses at a repetition rate corresponding to said predetermined rate of acceleration, and wherein said velocity control means comprises a velocity generator generating a second series of motion command electrical pulses at a repetition rate corresponding to said predetermined maximum velocity, said drive control means enabling one or the other series of pulses to be used as the motion command pulses to be supplied to the drive.

3. A system as defined in claim 2, wherein said acceleration control means further comprises acceleration sign determining means monitoring the "d" distance-to-go and switching, in response thereto, the acceleration generator from acceleration to deceleration.

4. A system as defined in claim 2, wherein said acceleration generator comprises a pulse generator producing pulses at a predetermined pulse repetition rate, a summing register, and means incrementing said latter register in one direction during acceleration, and in the opposite direction during deceleration, by the pulses produced by the pulse generator.

5. A system as defined in claim 4, wherein said acceleration generator further comprises an error register, means clearing the error register at the start of a positioning operation, means incrementing the error register according to one sign by the quantity "C" relating to said predetermined rate of acceleration, means incrementing the error register according to the opposite sign by the quantity in said summing register whenever a pulse is generated by said pulse generator, a sign detector detecting the sign of the error register, and means effective each time the error register is of said opposite sign to produce a motion command pulse and to increment the register according to said one sign by said quantity "C" until the error register passes zero and changes to said one sign.

6. A system as defined in claim 2, wherein said acceleration generator comprises: a pulse generator producing pulses at a predetermined pulse repetition rate; a summing register; means adding into said latter register during acceleration, and subtracting from said latter register during deceleration, the pulses produced by the pulse generator; an error register; means clearing the error register at the start of the positioning operation; means adding into the error register the quantity "C" relating to said predetermined rate of acceleration; means subtracting from the error register the quantity in said summing register whenever a pulse is generated by the pulse generator; a sign detector detecting the sign of the error register; and means effective, each time the error register is negative, to produce a motion command pulse and to add into the error register said quantity "C" until the error register becomes zero or positive.

7. A system as defined in claim 6, wherein said acceleration data is a constant value.

8. A system as defined in claim 6, wherein said acceleration data is a varying value.

9. A system as defined in claim 8, further including means sensing the inertia force produced by the acceleration of the article, and means producing in response thereto an electrical signal varying said acceleration data to provide a substantially constant inertia force during acceleration.

10. A system as defined in claim 9, further including means limiting the acceleration to a maximum value.

11. A system as defined in claim 8, further including means sensing the following-error between the actual position of the driven article and the commanded position thereof, and means producing in response thereto an electrical signal varying said acceleration data thereby controlling the acceleration to limit the following-error to a predetermined maximum.

12. A system as defined in claim 3, wherein said acceleration sign determining means comprises means normally controlling the acceleration generator for acceleration but switching the acceleration generator for deceleration whenever (a) "D" is twice larger than "B" and "$d$" is less than "B", or (b) whenever "D" is less than twice "B" and "$d$" is less than one-half "D".

13. A system as defined in claim 3, wherein said drive control means further includes a mode selecting system normally effective to disable said maximum velocity generator and enable said acceleration generator to produce the motion command pulses supplied to the drive, but effective to disable said acceleration generator and enable said maximum velocity generator to produce the motion command pulses whenever all said mentioned conditions exist.

14. A system as defined in claim 3, further including termination means producing a termination signal to the data input means whenever "$d$" is zero.

15. A system as defined in claim 14, wherein said termination means comprises a d-register, means preloading the d-register with the programmed distance quantity "D," means subtracting from the $d$-register the motion command pulses supplied to the drive, and a zero detector producing said termination signal whenever the d-register is zero.

16. A system as defined in claim 3, wherein said maximum velocity generator comprises a fixed frequency generator and a rate multiplier multiplying the output of the fixed frequency generator by the velocity data to produce said second series of motion command pulses.

17. A system as defined in claim 3, combination with a numerical control machine having a drive supplied with said motion command pulses to control the position of the article.

18. A programmable positioning system for supplying motion command pulses to a drive to move an article a programmed distance, comprising: data input means for inputting the programmed distance data "D," acceleration data rlating to a predetermined rate of acceleration, velocity data relating to a predetermined maximum velocity, and for establishing th value "B" corresponding to the distance to be traversed by the article when accelerated at said predetermined rate of acceleration from zero velocity to said predetermined maximum velocity; acceleration control means for generating a first series of electrical pulses at a repetition rate corresponding to said predetermined rate of acceleration; a velocity generator generating a second series of electrical pulses at a repetition rate corresponding to said predetermined maximum velocity; means for continuously computing the distance "d" corresponding to the remaining distance-to-go for the article to reach the programmed distance; and drive control means normally enabling said acceleration generator to generate said first series of electrical pulses to be supplied to the drive as motion command pulses, but enabling instead said velocity generator to generate said second series of electrical pulses to be supplied to the drive as motion command pulses whenever the programmed distance "D" is more than twice "B", and the computed distance "$d$" is more than "B" but less than "D" minus "B."

19. A system according to claim 18, wherein said acceleration control means comprises: a pulse generator producing pulses at a predetermined pulse repetition rate; a summing register; means adding into said latter register during acceleration, and subtracting from said latter register during deceleration, the pulses produced by the pulse generator; an error register; means clearing the error register at the start of the positioning operation; means adding into the error register the quantity "C" relating to said predetermined rate of acceleration; means subtracting from the error register the quantity in said summing register whenever a pulse is generated by the pulse generator; a sign detector detecting the sign of the error register; and means effective each time the error register is negative to produce an output electrical pulse for application to the drive as a motion command pulse, and to add into the error register said quantity "C" until the error register becomes zero or positive.

20. An acceleration control system, comprising: a pulse generator producing pulses at a predetermined pulse repetition rate; a summing register; means adding into said latter register during acceleration, and subtracting from said latter register during deceleration, the pulse produced by the pulse generator; an error register; means clearing the error register at the start of the acceleration operation; means incrementing the error register according to one sign by a quantity relating to a predetermined rate of acceleration; means incrementing the error register according to the opposite sign by the quantity in said summing register whenever a pulse is generated by the pulse generator; a sign detector detecting the sign of the error register; and means effective each time the error register is of said opposite sign to produce a motion command pulse and to increment the error register according to said one sign by said acceleration quantity until the error register becomes zero or of said one sign.

21. A system as defined in claim 20, wherein said one sign is positive and said opposite sign is negative.

22. A system as defined in claim 20, wherein said acceleration quantity is a constant value.

23. A system as defined in claim 20, wherein said acceleration quantity is a varying value.

24. A system as defined in claim 23, further including means sensing the inertia force produced by the acceleration of the article, and means producing in response thereto an electrical signal varying said acceleration quantity to provide a substantially constant inertia force during acceleration.

25. A system as defined in claim 24, further including means limiting the acceleration to a maximum value.

26. A system as defined in claim 23, further including means sensing the following-error between the actual position of the driven article and the commanded position thereof, and means producing in response thereto an electrical signal varying said acceleration quantity, thereby controlling the acceleration to limit the following-error to a predetermined maximum.

27. A system for coordinating a first quantity to a second quantity and a third quantity so that the first quatity varies according to the square of the second quantity at a rate according to the third quantity, comprising: a pulse generator producing pulses at a rate corresponding to said second quantity; a summing register; means incrementing said latter register, according to the sign of said third quantity, by the pulses produced by the pulse generator; an error register; means clearing the error register at the start of the coordinating operation; means incrementing the error register according to one sign by a quantity corresponding to said thire quantity; means incrementing the error register according to the opposite sign by the quantity in said summing register whenever a pulse is generated by the pulse generator; a sign detector detecting the sign of the error register; and means effective each time the error register is of said opposite sign to produce a pulse representing said first quantity and to increment said error register according to said one sign by said third quantity until the error register becomes zero or of said one sign.

28. A system according to claim 27, wherein the error register is incremented positively by the quantity corresponding to said third quantity, and is incremented negatively by the quantity in said summing register.

29. A system as defined in claim 27, wherein said predetermined rate is a constant quantity.

30. A system as defined in claim 27, wherein said predetermined rate is a variable quantity.

31. A system as defined in claim 27, wherein said first quantity represents distance, said second quantity represents time, and said third quantity represents acceleration.

* * * * *